T. DUYSENS.
PNEUMATIC HUB FOR VEHICLE WHEELS.
APPLICATION FILED APR. 20, 1911.
1,021,240.
Patented Mar. 26, 1912.
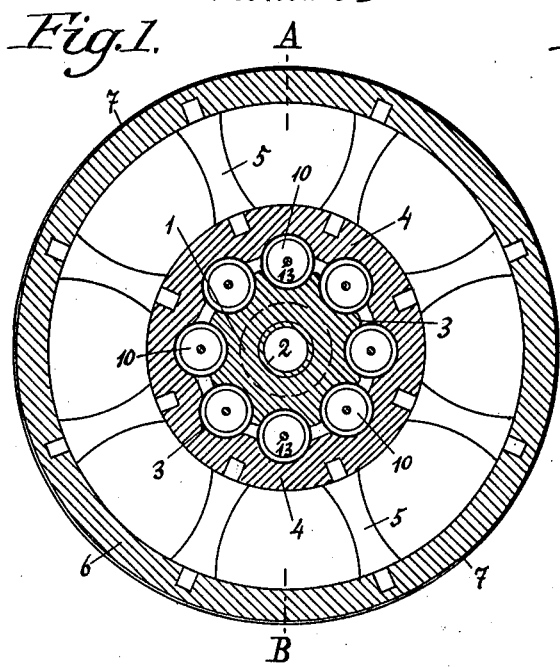
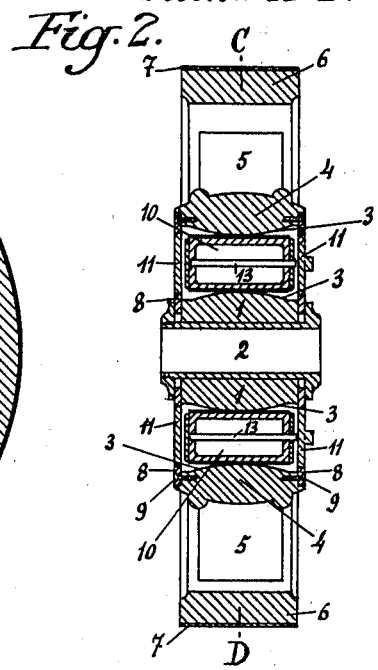
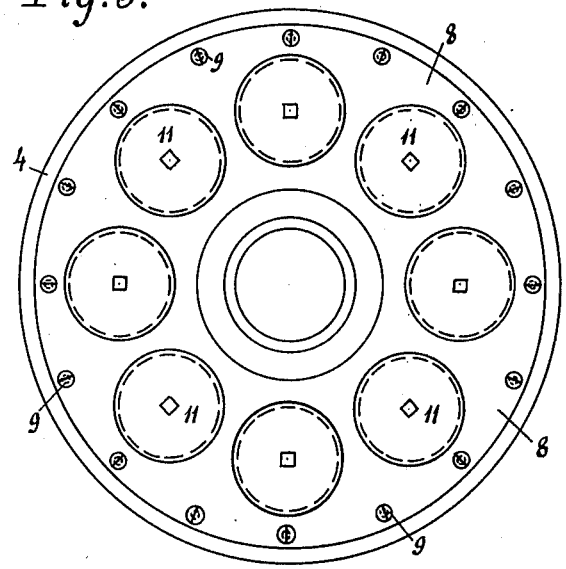
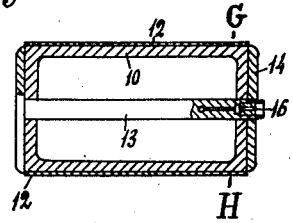
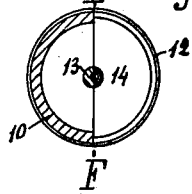
Witnesses:
Inventor:

UNITED STATES PATENT OFFICE.

TOSSANUS DUYSENS, OF MAASTRICHT, NETHERLANDS.

PNEUMATIC HUB FOR VEHICLE-WHEELS.

1,021,240. Specification of Letters Patent. Patented Mar. 26, 1912.

Application filed April 20, 1911. Serial No. 622,208.

*To all whom it may concern:*

Be it known that I, TOSSANUS DUYSENS, citizen of the Kingdom of the Netherlands, residing at Maastricht, Kingdom of the Netherlands, have invented Improvements in Pneumatic Hubs for Vehicle-Wheels, of which the following is a complete specification, reference being had to the accompanying drawings.

This invention has for its object to provide an improved pneumatic hub for all kinds of vehicle wheels which will absorb and equalize all shocks imparted to the vehicle in passing over rough ground or roads.

The improved pneumatic hub is designed to enable a pneumatic tire to be dispensed with and has the advantage that it is not so liable to be damaged as a tire.

One construction of the improved pneumatic tire is illustrated by way of example in the accompanying drawings, in which:

Figure 1 is a vertical section and Fig. 2 is a cross section of a vehicle wheel fitted with the improved hub. Fig. 3 is a side elevation of the hub shown separately, drawn to a larger scale. Figs. 4 and 5 are respectively a longitudinal section and a cross section of a detail, drawn to a still larger scale. Fig. 6 is half a side view.

As shown the improved hub comprises a hub center piece 1 fixed on the axle box 2, and formed on its periphery with transversely arched circumferential recesses 3 extending from one side to the other, the highest point of each arc being situated nearest to the central plane of the wheel viewed in cross section (Fig. 2).

4 is an outer hub ring encircling the center piece 1; it is formed likewise with transversely arc-shaped recesses on its inner periphery the said recesses corresponding in number, size, form or curvature, and in relative position with the recesses in the hub center piece 1. The outer hub ring 4 receives the inner ends of the wheel spokes 5 which are fitted at their outer ends in the wheel rim 6 that is surrounded by a tire 7. Annular disks 8 are arranged on both sides of the center piece 1 and the hub ring 4 and are fastened on the latter by means of screws 9. These disks extend over the sides of the center piece 1 and stop short of the inner edges of the hub ring 4. The diameter of the central opening of each disk 8 is so much larger than the diameter of the axle box as to allow sufficient freedom for vertical movement of the axle box inside the disk.

10 are hollow rubber rollers inserted between the arc-shaped recesses 3 of the center piece 1, and those of the hub ring 4. For the purpose of such insertion the disks 8 are formed with openings closed by screw covers 11. Each pneumatic roller 10 is encircled by a strong endless band 12 which protects the roller from bursting toward its periphery under the air pressure. Each rubber roller is also protected from bursting endwise by being traversed by a bolt 13 having a flat head 15 bearing against the outer end of the roller, while a plate shaped nut 14 is screwed up against the other end of the roller on the screwed end of the bolt. Each rubber roller is inflated by compressed air pumped in through the screwed end of its bolt 13 after removal of the corresponding side disk 8, a check valve 16 serving to prevent the escape of the air after inflation. When all the rubber rollers 10 (which are eight in number in the example shown) have been inflated, the center piece 1, and the hub ring 4, that is to say the entire wheel is concentric with the center of the wheel axle. The shocks due to the unevenness of the road are transmitted from the wheel rim through the spokes 5, and the outer hub 4 to the rubber rollers 10, by which they are absorbed so that they do not reach the center piece 1 or wheel axle or the actual vehicle.

In operation, in the case of eight rollers, the five lower rollers are always under load, while the three upper ones are free from load. The pressure is distributed by the two concave surfaces between which each rubber roller is held from the middle of each of said surfaces to the sides. The vehicle runs more safely and steadily than a vehicle fitted with pneumatic tires because only the top and bottom apexes of the convexities of the recesses 3 press upon the rubber rollers 10 (Fig. 2).

What I claim as my invention and desire to protect by Letters Patent is:—

1. A pneumatic vehicle wheel comprising in combination, a hub center part and a peripheral wheel portion surrounding the same, and a plurality of pneumatic cylinders interposed between said center part and wheel portion to yieldingly sustain the former in normal concentric relation with respect to the latter, said cylinders being arranged with their longitudinal axes disposed parallel with the axle bore of said center part, the opposing faces of the hub part and peripheral portions being curved in the plane of the wheel to form opposing concave seats engaging opposite peripheral portions of the cylinders, said seats being oppositely arched transversely with respect to the planes of wheel with the crowns of the arches disposed centrally of the plane of the wheel and engaging opposite longitudinal central portions of the cylinders, the lateral arched portions diverging away and extending inwardly and outwardly out of engagement with said cylinders, substantially described.

2. A pneumatic vehicle wheel comprising in combination, a hub center part and a peripheral wheel portion surrounding said center part, and a plurality of elongated pneumatic members interposed between said center part and wheel portions to yieldingly sustain the former in normal concentric relation within and with respect to the latter, said members being arranged with their longitudinal axes disposed parallel with the axle bore of said center part, the opposing faces of the hub part and peripheral portions being curved to form seats engaging the members, said seats being oppositely arched transversely with respect to the plane of the wheel with the crowns of the arches disposed centrally of the plane of the wheel and engaging opposite longitudinal central portions of the members.

3. A pneumatic vehicle wheel comprising in combination, a hub center part provided with transversely arched seats, a peripheral wheel portion surrounding said part and provided with transversely arched seats, pneumatic cylinders disposed in said seats, means restraining longitudinal pressure of said cylinders and means restraining radial pressure of said cylinders.

4. A pneumatic vehicle wheel comprising in combination, a hub center part provided with cylinder seats, a peripheral wheel portion surrounding said part and provided with cylinder seats, pneumatic cylinders disposed in said seats, means for restraining longitudinal pressure of said cylinders, and means for restraining radial pressure of said cylinders, substantially described.

In testimony of all I have hereunto subscribed my name.

TOSSANUS DUYSENS.

Witnesses:
MARTIN BAKER,
LEONARD KOOT.

Copies of this patent may be obtained for five cents each, by addressing the "Commissioner of Patents, Washington, D. C."